United States Patent
Anglin et al.

(10) Patent No.: US 7,590,777 B2
(45) Date of Patent: Sep. 15, 2009

(54) TRANSFERRING DATA BETWEEN SYSTEM AND STORAGE IN A SHARED BUFFER

(75) Inventors: Matthew Joseph Anglin, Tucson, AZ (US); Avishai Haim Hochberg, San Jose, CA (US); John Viksne, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 11/009,937

(22) Filed: Dec. 10, 2004

(65) Prior Publication Data

US 2006/0126653 A1 Jun. 15, 2006

(51) Int. Cl.
*G06F 3/00* (2006.01)
*H04L 1/00* (2006.01)
(52) U.S. Cl. .................................. 710/52; 370/235
(58) Field of Classification Search ............... 710/52
See application file for complete search history.

(56) References Cited

U.S. PATENT DOCUMENTS

| | | | |
|---|---|---|---|
| 5,166,674 A | | 11/1992 | Baum et al. |
| 5,212,772 A | * | 5/1993 | Masters ........................ 714/20 |
| 5,265,207 A | | 11/1993 | Zak et al. |
| 5,276,878 A | | 1/1994 | Sutton et al. |
| 5,490,168 A | | 2/1996 | Phillips et al. |
| 5,535,197 A | * | 7/1996 | Cotton .................. 370/395.72 |
| 5,673,381 A | | 9/1997 | Huai et al. |
| 5,745,685 A | | 4/1998 | Kirchner et al. |
| 5,897,661 A | | 4/1999 | Baranovsky et al. |
| 6,038,604 A | | 3/2000 | Bender et al. |
| 6,038,606 A | | 3/2000 | Brooks et al. |
| 6,044,079 A | | 3/2000 | Calvignac et al. |
| 6,397,308 B1 | | 5/2002 | Ofek et al. |
| 6,765,922 B1 | | 7/2004 | Bunton et al. |
| 7,512,135 B2 | | 3/2009 | Anglin et al. |
| 2004/0028063 A1 | | 2/2004 | Roy et al. |
| 2004/0039891 A1 | | 2/2004 | Leung et al. |
| 2004/0073724 A1 | * | 4/2004 | Wilson et al. ................. 710/52 |

(Continued)

FOREIGN PATENT DOCUMENTS

WO 02 27494 A 4/2002

(Continued)

OTHER PUBLICATIONS

Kreiger et al., The Alloc Stream Facility a Redesign of Application-Level Stream I/O, Computer, IEEE, vol. 27, No. 3, Mar. 1994.*

(Continued)

*Primary Examiner*—Henry W. H. Tsai
*Assistant Examiner*—Juanito C Borromeo
(74) *Attorney, Agent, or Firm*—Konrad Raynes & Victor LLP; David W. Victor (57) ABSTRACT

Provided are a method, system, and program for transferring data between system and storage in a shared buffer. An application requests a buffer from a component. The component allocates a buffer and returns to the application a first offset in the buffer for application data and a second offset in the buffer for a first header. The application writes the application data at the first offset in the buffer; and writes the first header at the second offset in the buffer. A second header is written to a third offset in the buffer.

41 Claims, 5 Drawing Sheets

U.S. PATENT DOCUMENTS

2004/0078534 A1     4/2004     Scheid
2004/0098547 A1     5/2004     Ofek et al.

OTHER PUBLICATIONS

Blunden et al., "Storage Networking Virtualization What's it all About", IBM Redbooks, XP002286341, Dec. 2000, pp. 1-124.

Krieger et al., "The Alloc Stream Facility a Redesign of Application-Level Stream I/O", Computer, IEEE, vol. 27, No. 3, Mar. 1994.

International Search Report and Written Opinion, for application PCT/Ep2005/056040, filed Nov. 17, 2005.

Communication pursuant to Article 94(3) EPC for Application 05 817 138.0- 1243, filed Aug. 19, 2008 4 pp.

Response to Office Communication, Feb. 24, 2009, for EP Application No. 05817138.0-1243, 4 pp.

U.S. Patent Application Client, entitled "Transferring Data Among a Logical Layer, Physical Layer and Storage Device", filed Dec. 12, 2004, invented by Anglin, M.F., K.A. Asher, D.M. Cannon, and E.C. Kissel.

Communication pursuant to Rules 109 and 110 EPC dated Jul. 26, 2007 for application no. 05817138.0-01243.

House, G., "Server-Free Backup/Restore", *White Paper*, © 2001 Crossroads Systems, Inc., pp. 1-5.

U.S. Appl. No. , entitled "Transferring Data Among a Logical Layer, Physical Layer and Storage Device", filed Dec. 12, 2004, invented by Anglin, M.F., K.A. Asher, D.M. Cannon, and E.C. Kissel.

* cited by examiner

TRANSFERRING DATA BETWEEN SYSTEM AND STORAGE IN A SHARED BUFFER

BACKGROUND OF THE INVENTION

1. Field of the Invention

The present invention relates to a method, system, and program for transferring data between system and storage in a shared buffer.

2. Description of the Related Art

In a network backup environment, a client system may backup data in a storage device and coordinate the backup with a backup server. For instance, the International Business Machines ("IBM"®) Tivoli® Storage Manager product provides software for a client and server systems to backup client data. (IBM and Tivoli are registered trademarks of IBM). The client machine may include multiple program components that process data being transferred between an application in the client and a storage device. Each component reads data from a buffer used by a previous component and then performs a memory copy operation to copy the data to a buffer allocated to the component. As part of processing the data as the data is being passed among the component allocated buffers, the program components may add header information to the data. A program component may read the data from a previous component' a buffer, process the data, add a new header to the data, and then write this data and new header to the buffer allocated to the component. The next program component in the chain of components processing the data may do the same.

SUMMARY

Provided are a method, system, and program for transferring data between system and storage in a shared buffer. An application requests a buffer from a component. The component allocates a buffer and returns to the application a first offset in the buffer for application data and a second offset in the buffer for a first header. The application writes the application data at the first offset in the buffer; and writes the first header at the second offset in the buffer. A second header is written to a third offset in the buffer.

In further embodiments, a first component requests a buffer from a second component. The second component allocates a buffer and returns to the first component a first offset in the buffer for application data and a second offset in the buffer for a first header. The second component writes the application data at the first offset in the buffer and writes the first header at the second offset in the buffer. A second header is written to a third offset in the buffer,

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
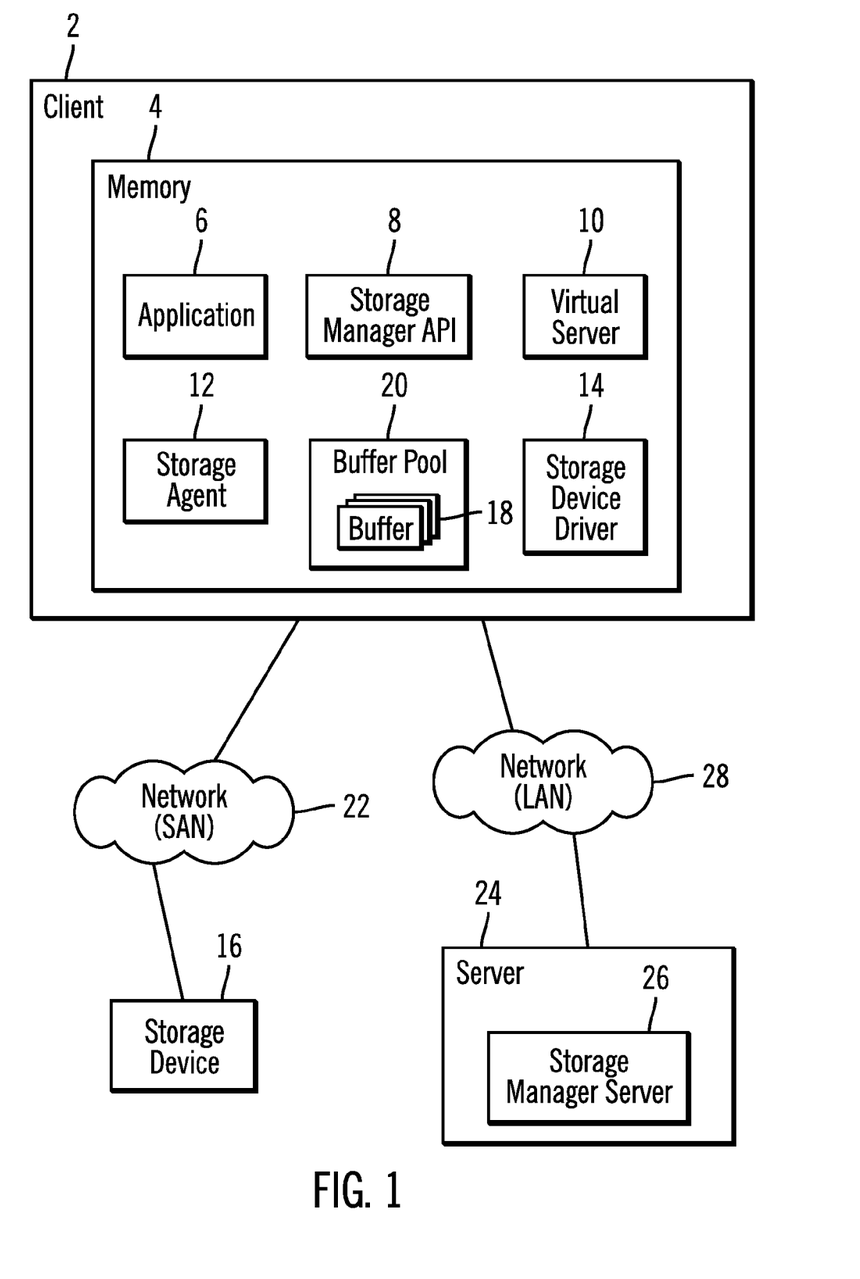
FIG. 1 illustrates an embodiment of a network computing environment.

FIG. 1 illustrates a network computing environment having a storage client 2 including a memory 4. The storage client 2 includes as program components an application 6, such as a database application, etc., a storage manager Application Program Interface (API) 8, a virtual server 10, a storage agent 12, and a storage device driver 14 providing an interface to writing to a storage device 16. The storage manager API 8 buffers 18 in a buffer pool 20.

In one embodiment, the storage device driver 14 communicates data to write to the storage device 16 over a network 22, such as a Storage Area Network (SAN). In an alternative embodiment, the client 2 may connect to the storage device 16 over a bus interface, such as a Peripheral Component Interconnect (PCI) bus, Small Computer System Interface (SCSI) bus, etc.

In one embodiment, the virtual server 10 may communicate information on data written to the storage device 16 to a server 24 having a storage manager server 26 over a second network 28, such as a Local Area Network (LAN). In this way, data to and from storage is transmitted over a first network, such as a SAN, and control information on data being transferred is sent over another network, such as a LAN. In an alternative embodiment, both data and information and commands for data transfer operations may be transmitted over a same network, not separate networks as shown in FIG. 1. The server 26 maintains information on data being stored in the storage device 16 in a backup database top manage the backup data sets.

Figure 2:
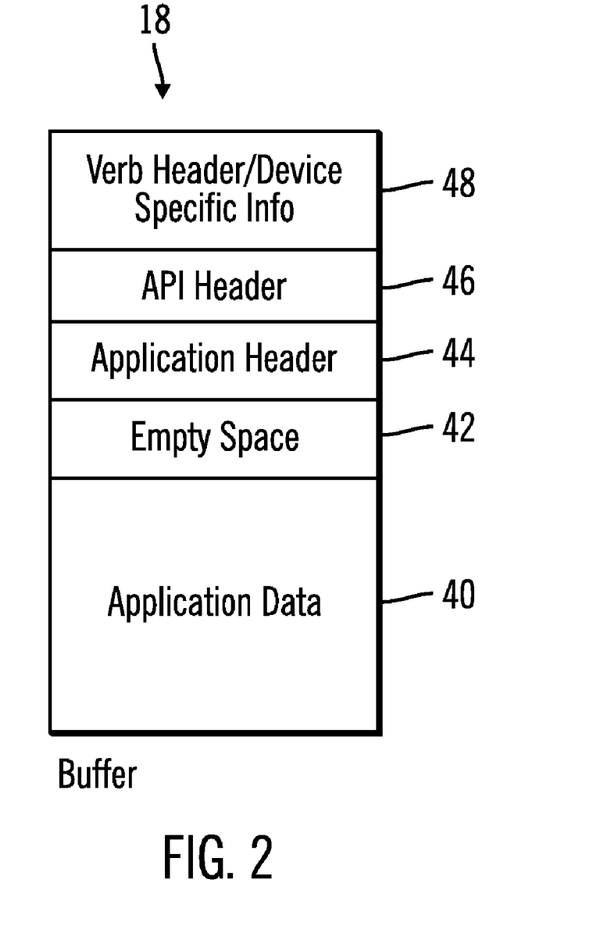
FIG. 2 illustrates an embodiment of a format of a buffer.

The storage manager API 8 allocates a buffer 18 in the buffer pool 20 to components in the client 2 to use to store data being transferred between the application 6 and the storage device 16. FIG. 2 illustrates information the components 6, 8, 10, 12, and 14 add to the buffer 18, including application data 40 and an application header 44 written by the application 6, an API header 46 written by the storage manager API 8, verb information 48 indicating how to process the buffer written by the storage manager API 8. In one embodiment, the storage agent 12 may overwrite the verb information 48 with device specific information 46 to enable the storage device driver 14 to transfer the data to the storage device 16. With the described embodiments, a component, e.g., 6, 8, 10, 12, and 14 communicates a pointer to the buffer content, including any header or other information the component wrote to the buffer, to the next component, e.g., 8, 10, 12, and 14, to process the buffer content. In this way, the buffer 18 is shared by the components, so each component that processes the data in the buffer and adds header information does not have to allocate an additional buffer in which to copy the content. Instead, each component may process the data and add header and other information to the same shared buffer, thereby avoiding the need to perform memory copy operations of the data to and from separate buffers.

Figure 3:
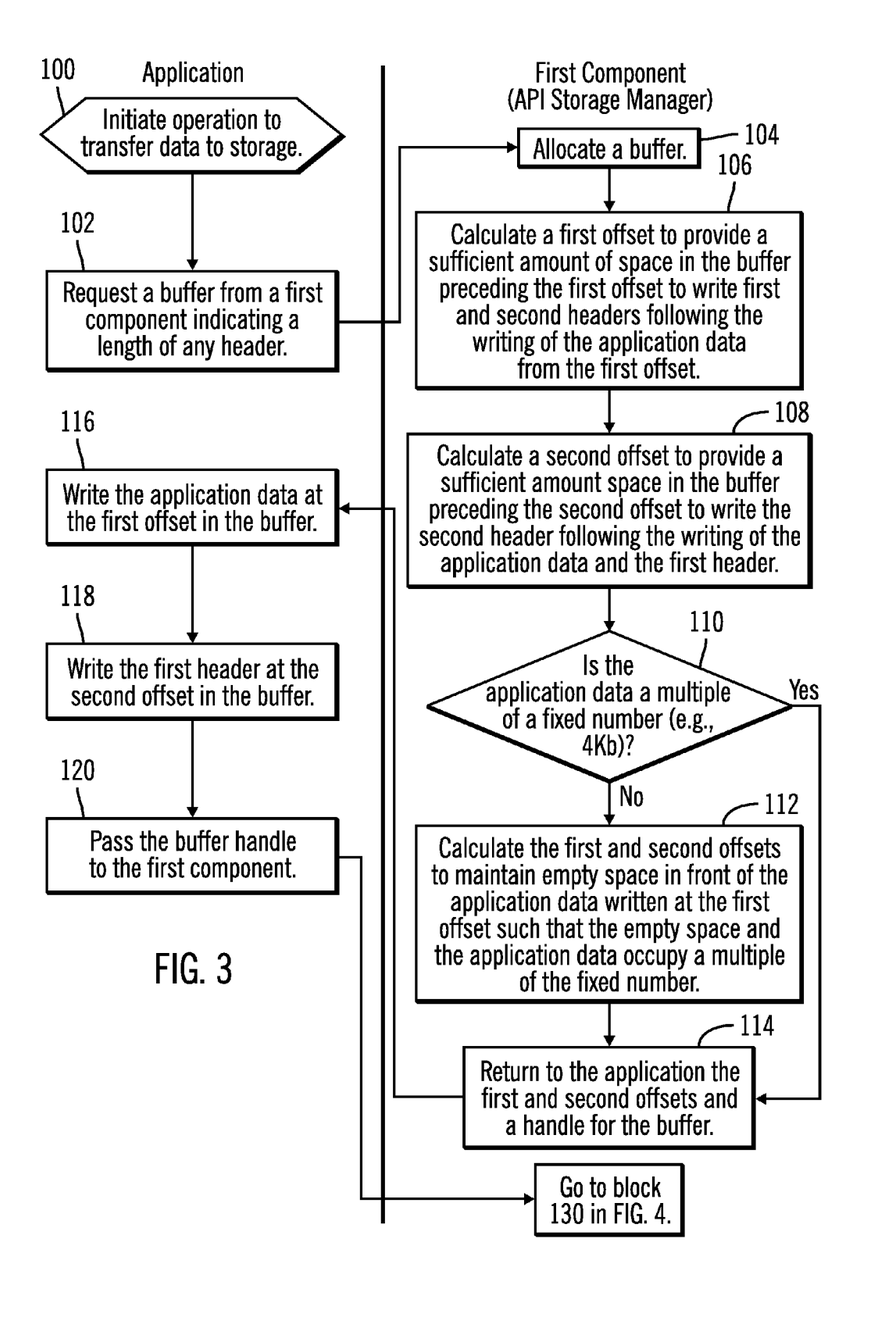
FIGS. 3, 4, and 5 illustrate an embodiment of operations to transfer data from an application to a storage device.

FIGS. 3, 4, and 5 illustrate operations performed by the components, e.g., 6, 8, 10, 12, and 14m to transfer data among the components for transfer to the storage device 16. With respect to FIG. 3, the application 6 initiates (at block 100) an operation to transfer application data to the storage device 16 by requesting (at block 102) one or more buffers 18 from the storage manager API 8. This request may include a maximum length of the header the application 6 intends to write, which length may be zero if the application 6 will not write a header. In response, the storage manager API 8 allocates (at block 104) one or more buffers 18 to the application indicated as free buffers 18 in the buffer pool 20. The first component, or storage manager API 8, calculates (at block 106) a first offset for the application data 40 to provide a sufficient amount of space in the buffer 18 preceding the first offset to write the first and second headers, e.g., application header 42 and API header 44, following the writing of the application data 40 from the first offset. The first offset may provide sufficient space in the buffer 18 for the length of the header indicated with the request. Thus the first offset addresses where the application data 40 starts in the buffer 18. The first component 8 further calculates (at block 108) a second offset to provide a sufficient amount space in the buffer preceding the second offset to write the second header, e.g., API header 44, following the writing of the application data 40 and the application header 42. In this way, the offsets are calculated to allow one component to write data in front of the data written by a previous component, thereby allowing components to add headers in front of previously written application data 40 and headers. Further, there may be a data structure at the top of the buffer 18 that has information on all headers, 4.g., 48, 46, 44 and data 40, including the offset in the buffer 18 and length of each header to enable any of the components 6, 8, 10, 12, and 14 to determine the location of the headers and data in the buffer 18.

In described embodiments, the storage manager API 8 may want to ensure that data remains on fixed boundary areas, such as 4K boundaries. When an application 6 I/O to the storage device 16, the buffer 18 is passed to the kernel for I/O. In order to achieve Direct Memory Addressing (DMA), the kernel can "pin" the buffer 18 into physical memory 4 (as opposed to virtual memory), so that the I/O device (PCI bus, SCSI bus, SAN, etc), can gain access to the data and send it to the appropriate device. This "pinning" of the buffer 18 prevents other applications from using the data while the I/0 transfer is in progress (on the bus).

If (at block 110) the pointer application data 40 is not a multiple of a fixed number (e.g., 4 kilobytes (Kb)), then the first component (storage manager API 8) calculates (at block 112) the first and second offsets to maintain empty space in front of the application data written at the first offset such that the empty space and the application data occupy a multiple of the fixed number, or 4 Kb. For instance, the second offset may comprise an offset from the first offset that equals the amount of empty space 42 needed to align the application data 40 on a 4 Kb boundary and the length of the header to be written starting at the second offset, e.g., the application header 44. The first component 8 returns to the application 6 (at block 114) the first and second offsets and a handle for the allocated buffer 18.

In response to the offsets, the application 6 writes (at block 116) the application data 40 at the first offset in the buffer 18 and writes (at block 118) the first header, e.g., application header 44 at the second offset in the buffer 18. The writing of the application header 44 may be optional. After writing, the application 6 passes (at block 120) the buffer handle to the first component (storage manager API 8).

Figure 4:
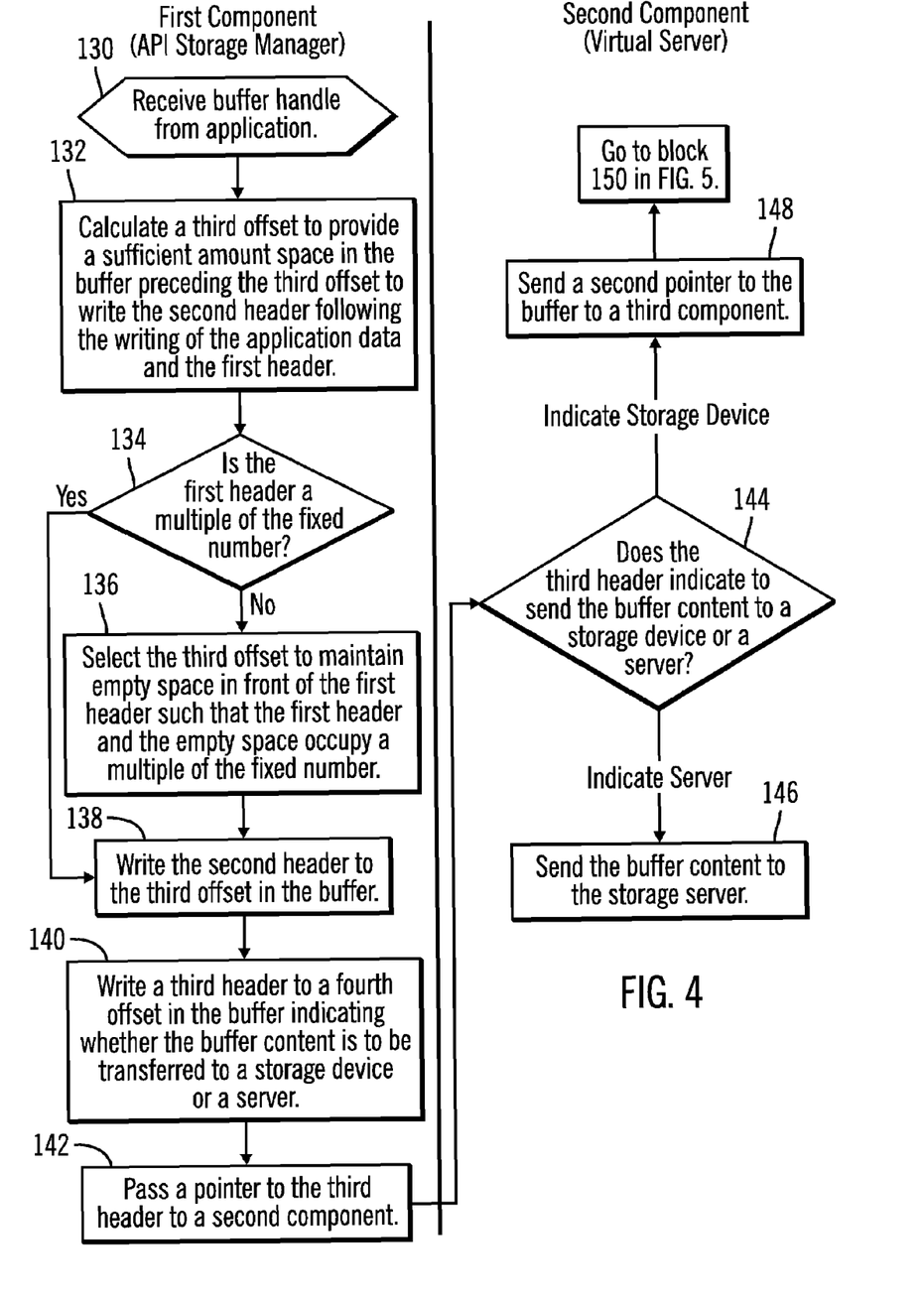

With respect to FIG. 4, upon receiving (at block 130) the buffer handle from the application 6, the first component (storage manager API 8) calculates (at block 132) a third offset to provide a sufficient amount space in the buffer preceding the third offset to write the second header (API header 46) following the writing of the application data 40 and the first header (application header 44). In one embodiment, if (at block 134) the first header (application header 44) is a multiple of the fixed number, e.g., 4 Kb, then the storage manager API 8 selects (at block 136) the third offset to maintain empty space in front of the first header such that the first header and the empty space occupy a multiple of the fixed number (4 Kb). The second header (API header 46) is written (at block 138) to the third offset in the buffer 18. The storage manager API 8 further writes (at block 140) a third header (verb header 48) to a fourth offset in the buffer indicating whether the buffer content is to be transferred to the storage device 16 or a server 24. The storage manager API 8 indicates to transfer data intended for the storage device 16 to the storage device 16 and transfer backup commands and related information to the server 24 managing client 2 backup operations. The storage manager API 8 then passes (at block 142) a pointer to the third header to a second component, such as the virtual server 10.

In response to receiving the pointer to the third header, the virtual server 10 determines (at block 144) whether the third header, e.g., verb header 48, indicates to send the buffer content to the storage device 16 or the server 24. If (at block 144) the content is intended for the server 24, then the virtual server 10 transmits (at block 146) the buffer content to the server 24 over the network 28. Otherwise, if (at block 144) the content is intended for the storage device 16, then the virtual server 10 sends (at block 148) a second pointer to the buffer 18 to third component, such as the storage agent 12.

Figure 5:
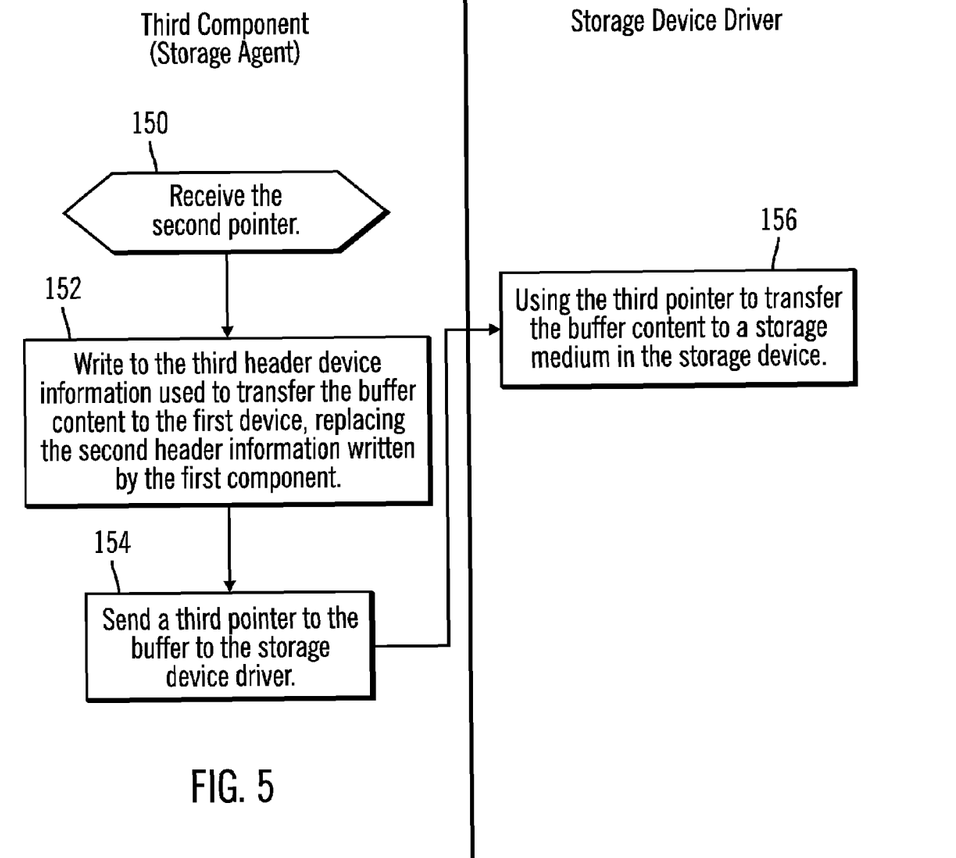

With respect to FIG. 5, in response to receiving (at block 150) the second pointer, the third component (storage agent 12) writes (at block 152) to the third header device information used to transfer the buffer content to the first device. This device specific information replaces the second header information written by the first component (storage manager API 8). The storage agent 12 then sends (at block 154) a third pointer to the buffer 18 to the storage device driver 14. In response, the storage device driver 14 uses the third pointer to access and transfer the buffer 18 content to a storage medium in the storage device 16, such as a magnetic storage medium (e.g., hard disk drive, magnetic tape, etc), optical storage medium or other suitable non-volatile storage medium known in the art.

In additional embodiments, certain of the headers may not be written. For instance, if the application 6 or storage manager API 8 did not write one header 44, 46, then the second header would comprise the verb data 48. Alternatively, the components may write additional headers requiring further offset calculations. Further, an offset above any written header may take into account empty space to add above the previously written header to ensure that the empty space and the written header fall on a 4 Kb boundary. In this way, the header 44 written at the offset following empty space 42 extends from the offset to the start of the empty space 42.

In one embodiment, the first offset is greater than the second offset, the second offset is greater than the third offset, and the third offset is greater than the fourth offset. In this way, each subsequent component processing data may write a header to the data at an offset to place the additional header above previously written application data and headers written to the buffer.

In a further embodiment, the application 6 may request data from the storage device 16. In response, the storage device driver 14 accesses the data and returns the data to the storage agent 12. The storage agent 12 (or some other component) may then request a buffer 18 from the storage manager API 8 to add the retrieved data. The components may then perform the offset calculations to provide offsets to provide room in the buffer 18 to allow components to add headers to the retrieved application data to the buffer 18, such that the pointer to the buffer is eventually passed to the application 6 to access the data.

With described embodiments, different components share a buffer and access data from this same buffer and write header information to this same buffer, and pass pointers to the buffer to further components to enable the further components access to the buffer.

In further embodiments, the application may request a plurality of buffers from the storage manager API 8 and then concurrently write application data 40 and application header 44 data to multiple buffers and then pass the handle to the buffers to the storage manager API 8 to further process.

ADDITIONAL EMBODIMENT DETAILS

The described operations may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The illustrated operations of FIGS. 3-5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
    requesting, by an application, a buffer from a first component;
    allocating, by the first component, the buffer;
    calculating, by the first component, a first and second offsets in the buffer, where the first offset is calculated to point to a position in the buffer to provide a first sufficient amount of space in the buffer preceding the first offset to write first and second headers in front of the first offset in the buffer, and wherein the second offset is calculated to provide a second sufficient amount of space in the buffer to write the second header in front of the second offset in the buffer, wherein the first and second offsets are calculated to provide first and second sufficient amounts of space to allow the writing of data in front of data previously written to the buffer;
    returning, by the first component, to the application the first offset in the buffer for application data and the second offset in the buffer for the first header;
    writing, by the application, the application data at the first offset in the buffer;
    writing, by the application, the first header at the second offset in the buffer;
    writing a second header to a third offset in the buffer;
    passing a pointer to the second header to a second component; and
    processing, by the second component, the second header in the buffer in response to receiving the pointer to determine how to process the buffer.

2. The method of claim 1, wherein the first offset is greater than the second offset and the second offset is greater than the third offset.

3. The method of claim 1, wherein the first component writes the second header to the buffer, further comprising:
    writing a third header to a fourth offset in the buffer, wherein the first offset is greater than the second offset, the second offset is greater than the third offset, and the third offset is greater than the fourth offset.

4. The method of claim 1, further comprising:
    replacing, by the second component, the second header with information used to transfer buffer content to a storage device.

5. The method of claim 1, wherein the second header at the third offset indicates that buffer content comprising the application data and headers is to be transferred to a first device or second device, further comprising:
    passing, by the first component, a pointer to the second header to the second component;
    processing, by the second component, the second header to determine whether to send the buffer content to a first device or a second device; and
    writing to the second header device information used to transfer the buffer content to the first device in response to determining that the second header indicates to send the buffer content to the first device, wherein the device information replaces the second header information written by the first component.

6. The method of claim 5, wherein the first device comprises a storage device, further comprising:
    using, by a storage device driver for the storage device, the device information in the second header to transfer the buffer content from the buffer to the storage device in response to determining buffer content is to be sent to the storage device.

7. The method of claim 6, wherein the pointer passed by the first component comprises a first pointer, further comprising:
    sending, by the second component, a second pointer to the buffer to a third component in response to determining that buffer content is to be sent to the storage device, wherein the third component writes the device information to the second header; and
    sending, by the third component, a third pointer to the buffer to the storage device driver, wherein the storage device driver uses the third pointer to write content of the buffer to a storage medium in the storage device.

8. The method of claim 7, wherein the first component comprises an Application Program Interface (API) of a storage manager and the third component comprises a storage agent.

9. The method of claim 5, wherein the second device comprises a storage server, further comprising:
sending, by the second component, the buffer content to the storage server in response to determining that the second header indicates to send the buffer content to the storage server.

10. The method of claim 1, further comprising:
calculating, by the first component, the third offset to provide that there is a sufficient amount space in the buffer preceding the third offset to write the second header following the writing of the application data and the first header.

11. The method of claim 1, further comprising:
determining whether the application data is a multiple of a fixed number, wherein the first and second offsets are calculated to maintain empty space in front of the application data written at the first offset such that the empty space and the application data occupy a multiple of the fixed number in response to determining that the application data is not a multiple of the fixed number, wherein the first header extends from the second offset to a start of the empty space.

12. The method of claim 11, further comprising:
determining whether the first header is a multiple of the fixed number, wherein the third offset is selected to maintain empty space in front of the first header such that the first header and the empty space occupy a multiple of the fixed number in response to determining that the first header is not a multiple of the fixed number, wherein the second header extends from the third offset to a start of the empty space in front of the first header.

13. The method of claim 11, wherein the fixed number comprises four kilobytes, and wherein the application data is not a multiple of the fixed number if the application data written to the buffer at the first offset is not aligned on a four kilobyte boundary in the buffer.

14. The method of claim 1, further comprising:
requesting, by the application a plurality of buffers;
returning, by the first component, the plurality of buffers to the application;
concurrently writing, by the application, application data and first headers to the plurality of buffers.

15. A method, comprising:
requesting, by a first component, a buffer from a second component;
allocating, by the second component, a buffer;
calculating, by the second component, a first and second offsets in the buffer, wherein the first offset is calculated to point to a position in the buffer to provide a first sufficient amount of space in the buffer preceding the first offset to write data first and second headers in front of the first offset in the buffer, and wherein the second offset is calculated to provide a second sufficient amount of space in the buffer to write the second header in front of the second offset in the buffer, wherein the first and second offsets are calculated to provide first and second sufficient amounts of space to allow the writing of data in front of data previously written to the buffer;
returning, by the second component, to the first component the first offset in the buffer for application data and the second offset in the buffer for the first header;
writing, by the second component, the application data at the first offset in the buffer;
writing, by the second component, the first header at the second offset in the buffer; and
writing, by a third component, the second header to a third offset in the buffer.

16. The method of claim 15, wherein the first offset is greater than the second offset and the second offset is greater than the third offset.

17. The method of claim 15, wherein the first component writes application data retrieved from a storage device to the buffer, further comprising:
passing, by the second component, a pointer to the buffer to an application that initiated the request for the data.

18. A system, comprising:
a processor;
a memory accessible to the processor and having buffers;
code in a computer readable medium including an application and component, wherein the processor executes the code to cause the application and first and second components to cause operations to be performed, the operations comprising:
requesting, by an application, a buffer in the memory from the first component;
allocating, by the first component, the buffer;
calculating, by the first component, a first and second offsets in the buffer, where the first offset is calculated to point to a position in the buffer to provide a first sufficient amount of space in the buffer preceding the first offset to write first and second headers in front of the first offset in the buffer, and wherein the second offset is calculated to provide a second sufficient amount of space in the buffer to write the second header in front of the second offset in the buffer, wherein the first and second offsets are calculated to provide first and second sufficient amounts of space to allow the writing of data in front of data previously written to the buffer;
returning, by the first component, to the application the first offset in the buffer for application data and the second offset in the buffer for the first header;
writing, by the application, the application data at the first offset in the buffer;
writing, by the application, the first header at the second offset in the buffer;
writing a second header to a third offset in the buffer;
passing a pointer to the second header to the second component; and
processing, by the second component, the second header in the buffer in response to receiving the pointer to determine how to process the buffer.

19. The system of claim 18, wherein the first component writes the second header to the buffer, wherein the operations further comprise:
writing, by the second component, a third header to a fourth offset in the buffer, wherein the first offset is greater than the second offset, the second offset is greater than the third offset, and the third offset is greater than the fourth offset.

20. The system of claim 18, wherein the second header at the third offset indicates that buffer content comprising the application data and headers is to be transferred to a first device or second device, wherein the operations further comprise:
passing, by the first component, a pointer to the second header to the second component;

processing, by the second component, the second header to determine whether to send the buffer content to a first device or a second device; and writing to the second header device information used to transfer the buffer content to the first device in response to determining that the second header indicates to send the buffer content to the first device, wherein the device information replaces the second header information written by the first component.

21. The system of claim 20, wherein the first device comprises a storage device, wherein the operations further comprise:

using, by a storage device driver for the storage device, the device information in the second header to transfer the buffer content from the buffer to the storage device in response to determining buffer content is to be sent to the storage device.

22. The system of claim 20, wherein the second device comprises a storage server, wherein the operations further comprise:

sending, by the second component, the buffer content to the storage server in response to determining that the second header indicates to send the buffer content to the storage server.

23. The system of claim 18, wherein the operations further comprise:

calculating, by the first component, the third offset to provide that there is a sufficient amount space in the buffer preceding the third offset to write the second header following the writing of the application data and the first header.

24. The system of claim 18, wherein the operations further comprise:

determining whether the application data is a multiple of a fixed number, wherein the first and second offsets are calculated to maintain empty space in front of the application data written at the first offset such that the empty space and the application data occupy a multiple of the fixed number in response to determining that the application data is not a multiple of the fixed number, wherein the first header extends from the second offset to a start of the empty space.

25. An article of manufacture comprising a computer readable storage medium including an application and a first and second components in communication with a memory including buffers, wherein the application and the first and second components are capable of being executed to cause operations to be performed, the operations comprising:

requesting, by the application, a buffer from the first component;

allocating, by the first component, the buffer;

calculating, by the first component, a first and second offsets in the buffer, where the first offset is calculated to point to a position in the buffer to provide a first sufficient amount of space in the buffer preceding the first offset to write first and second headers in front of the first offset in the buffer, and wherein the second offset is calculated to provide a second sufficient amount of space in the buffer to write the second header in front of the second offset in the buffer, wherein the first and second offsets are calculated to provide first and second sufficient amounts of space to allow the writing of data in front of data previously written to the buffer;

returning, by the first component, to the application the first offset in the buffer for application data and the second offset in the buffer for the first header;

writing, by the application, the application data at the first offset in the buffer;

writing, by the application, the first header at the second offset in the buffer;

writing a second header to a third offset in the buffer;

passing a pointer to the second header to the second component; and processing, by the second component, the second header in the buffer in response to receiving the pointer to determine how to process the buffer.

26. The article of manufacture of claim 25, wherein the first offset is greater than the second offset and the second offset is greater than the third offset.

27. The article of manufacture of claim 25, wherein the first component writes the second header to the buffer, wherein the operations further comprise:

writing a third header to a fourth offset in the buffer, wherein the first offset is greater than the second offset, the second offset is greater than the third offset, and the third offset is greater than the fourth offset.

28. The article of manufacture of claim 25, wherein the operations further comprise:

replacing, by the second component, the second header with information used to transfer buffer content to a storage device.

29. The article of manufacture of claim 25, wherein the second header at the third offset indicates that buffer content comprising the application data and headers is to be transferred to a first device or second device, wherein the operations further comprise:

passing, by the first component, a pointer to the second header to the second component;

processing, by the second component, the second header to determine whether to send the buffer content to a first device or a second device; and writing to the second header device information used to transfer the buffer content to the first device in response to determining that the second header indicates to send the buffer content to the first device, wherein the device information replaces the second header information written by the first component.

30. The article of manufacture of claim 29, wherein the first device comprises a storage device, wherein the operations further comprise:

using, by a storage device driver for the storage device, the device information in the second header to transfer the buffer content from the buffer to the storage device in response to determining buffer content is to be sent to the storage device.

31. The article of manufacture of claim 30, wherein the pointer passed by the first component comprises a first pointer, wherein the operations further comprise:

sending, by the second component, a second pointer to the buffer to a third component in response to determining that buffer content is to be sent to the storage device, wherein the third component writes the device information to the second header; and sending, by the third component, a third pointer to the buffer to the storage device driver, wherein the storage device driver uses the third pointer to write content of the buffer to a storage medium in the storage device.

32. The article of manufacture of claim 31, wherein the first component comprises an Application Program Interface (API) of a storage manager and the third component comprises a storage agent.

33. The article of manufacture of claim 29, wherein the second device comprises a storage server, wherein the operations further comprise:

sending, by the second component, the buffer content to the storage server in response to determining that the second header indicates to send the buffer content to the storage server.

34. The article of manufacture of claim 33, wherein the operations further comprise:

calculating, by the first component, the third offset to provide that there is a sufficient amount space in the buffer preceding the third offset to write the second header following the writing of the application data and the first header.

35. The article of manufacture of claim 25, wherein the operations further comprise:

determining whether the application data is a multiple of a fixed number, wherein the first and second offsets are calculated to maintain empty space in front of the application data written at the first offset such that the empty space and the application data occupy a multiple of the fixed number in response to determining that the application data is not a multiple of the fixed number, wherein the first header extends from the second offset to a start of the empty space.

36. The article of manufacture of claim 35, wherein the operations further comprise:

determining whether the first header is a multiple of the fixed number, wherein the third offset is selected to maintain empty space in front of the first header such that the first header and the empty space occupy a multiple of the fixed number in response to determining that the first header is not a multiple of the fixed number, wherein the second header extends from the third offset to a start of the empty space in front of the first header.

37. The article of manufacture of claim 35, wherein the fixed number comprises four kilobytes, and wherein the application data is not a multiple of the fixed number if the application data written to the buffer at the first offset is not aligned on a four kilobyte boundary in the buffer.

38. The article of manufacture of claim 25, wherein the operations further comprise:

requesting, by the application a plurality of buffers;

returning, by the first component, the plurality of buffers to the application;

concurrently writing, by the application, application data and first headers to the plurality of buffers.

39. An article of manufacture comprising a computer readable storage medium having an application, a first component, and a second component in communication with a memory including buffers, wherein the application and the first and second components are executed to cause operations to be performed, the operations comprising:

requesting, by a first component, a buffer from a second component;

allocating, by the second component, a buffer;

calculating, by the second component, a first and second offsets in the buffer, wherein the first offset is calculated to point to a position in the buffer to provide a first sufficient amount of space in the buffer preceding the first offset to write data first and second headers in front of the first offset in the buffer, and wherein the second offset is calculated to provide a second sufficient amount of space in the buffer to write the second header in front of the second offset in the buffer, wherein the first and second offsets are calculated to provide first and second sufficient amounts of space to allow the writing of data in front of data previously written to the buffer;

returning, by the second component, to the first component the first offset in the buffer for application data and the second offset in the buffer for the first header;

writing, by the second component, the application data at the first offset in the buffer;

writing, by the second component, the first header at the second offset in the buffer; and writing, by a third component, the second header to a third offset in the buffer.

40. The method of claim 39, wherein the first offset is greater than the second offset and the second offset is greater than the third offset.

41. The method of claim 39, wherein the first component writes application data retrieved from a storage device to the buffer, further comprising:

passing, by the second component, a pointer to the buffer to an application that initiated the request for the data.

* * * * *